C. S. LOCKWOOD.
COLLARED SPIRALLY WOUND ROLL.
APPLICATION FILED AUG. 10, 1911.
1,029,075.
Patented June 11, 1912.
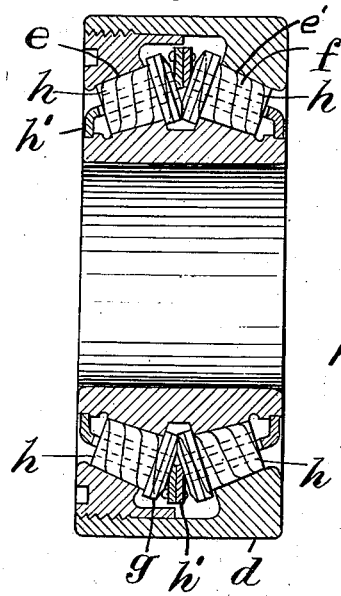
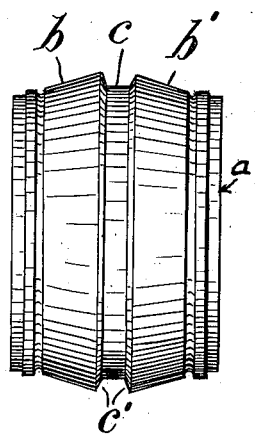
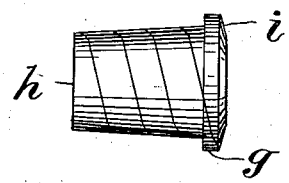
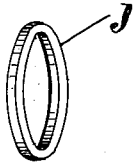
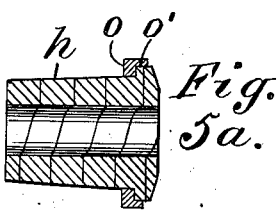
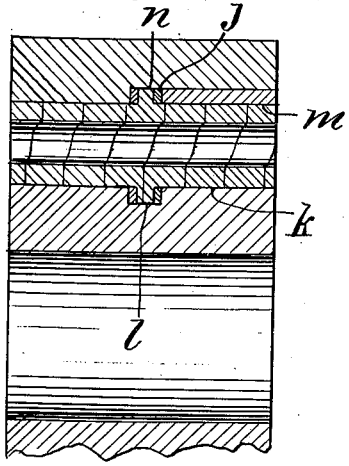
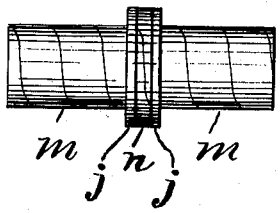
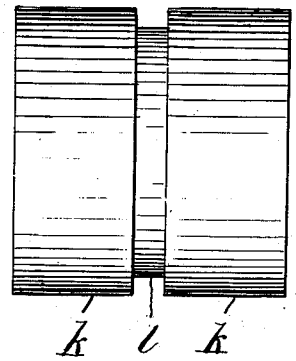
Witnesses:
L. Lee,
J. Walter Greenbaum.
Inventor
Charles S. Lockwood,
per Thomas S. Crane, Atty.

UNITED STATES PATENT OFFICE.

CHARLES S. LOCKWOOD, OF NEWARK, NEW JERSEY, ASSIGNOR TO HYATT ROLLER BEARING COMPANY, OF HARRISON, NEW JERSEY, A CORPORATION OF NEW JERSEY.

COLLARED SPIRALLY-WOUND ROLL.

1,029,075.  Specification of Letters Patent.  Patented June 11, 1912.

Application filed August 10, 1911. Serial No. 643,258.

*To all whom it may concern:*

Be it known that I, CHARLES S. LOCKWOOD, a citizen of the United States, residing at 289 Market street, Newark, county of Essex and State of New Jersey, have invented certain new and useful Improvements in Collared Spirally - Wound Rolls, fully described and represented in the following specification and the accompanying drawings, forming a part of the same.

This invention is a modification of that patented to me April 26, 1910 with No. 955,888 for a roller bearing with combined thrust and bearing rolls, and the invention consists in making the rolls with a spirally wound body and an integral collar upon the same; but the present invention is applicable to other bearings. In the said patent, two sets of conical rolls were shown fitted to opposed conical roll-seats and having collars upon their larger ends to rotate in contact with one another in a groove formed at the junction of the seats. Such rolls have heretofore always been made solid, and the object of the present invention is to secure in such a construction the advantages of a spirally wound roll which possesses far greater elasticity than a solid roll.

As spirally wound rolls are formed of a strip of uniform thickness, no attempt has heretofore been made to use them in constructions where a collar upon the end of the roll was required, as the surface of a roll formed of a spirally wound strip has merely a continuous straight surface, and the roll cannot be enlarged in winding to form a collar thereon. I have devised a means of providing such a roll with a collar, which consists in forming the roll primarily from a strip much thicker than is required for the finished roll and reducing the roll externally for the greater part of its length after the roll is wound, leaving a collar of the desired proportions at any required point upon the roll. The collar itself is thus an integral attachment of the coils which form the roll and shares in the elasticity of the roll-body, which in its final dimensions is proportioned to sustain the load to which it is subjected.

The invention will be understood by reference to the annexed drawing, in which—

Figure 1 is a longitudinal section, where hatched, of a bearing having the spirally wound rolls with loose washers adjoining the collars; Fig. 2 is an elevation of the hub for such bearing; Fig. 3 is an elevation of the primary roll of plain cylindrical form; Fig. 4 is an elevation of the roll separate from the bearing; and Fig. 5 is a perspective view of the washer for the roll-collar; Fig. 5ª shows an alternative form for the washer; Fig. 6 is a longitudinal section, where hatched, of one side of a bearing having cylindrical rolls with a collar at the middle of their length; Fig. 7 is an elevation of the entire hub for such bearing; and Fig. 8 is an elevation of one of the rolls separate from the bearing.

$a$ represents the hub of the bearing having conical seats $b$ and $b'$ with their bases adjoining and separated by a groove $c$ having shoulders $c'$ at its opposite ends formed at right angles to the surfaces of the conical seats. The external casing $d$ is shown with conical seats $e$ and $e'$, and the conical rolls $f$ are fitted between the seats of the hub and the casing, with collar $g$ extending into the groove $c$.

The roll, as shown in Fig. 3, is primarily formed by winding upon a suitable mandrel a strip of sufficient thickness to make the primary roll $g'$ of the diameter required for the collar $g$. The roll is then turned down, as shown in Fig. 4, to form the tapering body, leaving the collar $g$ at one end of the same. The forming of the roll from a strip produces a spiral division $h$ between the several coils, and such division also intersects the collar obliquely.

The rolls are in practice held opposite to one another in pairs by suitable openings in the cage $h'$, and the collars upon the rolls may thus be held with their outer opposed sides in contact, being formed with a suitable bevel $i$ to increase the contact surface.

The inner faces of the collars are designed to react against the shoulders $c'$ when the hub or casing of the bearing is subjected to end thrust; as the thrust is transmitted from one set of rolls to the other, the collars thus preventing any displacement of the rolls upon their seats.

As the spiral division which intersects the collar forms a joint in the collar with a thin beveled edge upon one side of such joint, it is undesirable to have such joint rotate in direct contact with the shoulder $c'$; and a washer $j$ is therefore shown applied to the body of the roll between the collar and the shoulder $c'$, to sustain the wear against the shoulder. Such washer may be made to turn loosely adjoining the collar $g$ or it may be fitted tightly to the body of the roll so as to turn therewith.

Where the collars contact at their outer sides, as in Fig. 1, there is some tendency to loosen or displace the thin end of the coil which forms the collar $g$, and such tendency is readily corrected by forming the washer $o$ with a counterbore $o'$, as shown in Fig. 5$^a$, so as to embrace the periphery of the collar $g$ and thus prevent any displacement or distortion of the coil which forms the collar. Such washer is not essential where the bearing is not subjected to serious end strain, and where the collars $g$ are required only to hold the rolls in place under direct lateral strain. In such cases, the groove $c$ is, of course, made of suitable width to receive the collars and have them contact directly with the shoulders $c'$.

The hub shown in Fig. 7 is formed with cylindrical seats $k$ at its ends and a groove $l$ at the middle of its length, and the rolls $m$ are made cylindrical and formed with a collar $n$ at the middle of the length with washers at both sides fitted to the groove $l$. Such rolls are made in the same manner as the conical rolls of Fig. 1, by first forming a primary roll, of diameter suitable to produce the collar $n$, and the turning down of the roll at each side of the collar to form the body $m$.

It is found in practice that the formation of the collared rolls from a spirally wound strand is very advantageous, as the body of the roll around its interbore may be made of any suitable thickness, by suitably proportioning the strand at the outset to produce the collar, and afterward leave the body of the desired thickness when turned smaller than the collar. The spirally formed body possesses great elasticity, and the bearings provided with such rolls thus support the load with less shock and jar, as in automobile wheels. The parts carried by the bearings are thus jarred much less violently than if sustained upon solid rolls, and the durability of the bearing and of the parts carried thereby is greatly increased. The application of the washers to protect the sides of the roll-collars which wear against the hub, secures the same durability as a solid roll and collar would possess. The washers can also be cheaply renewed, when worn, as they form a very cheap and simple element of the construction.

Having thus set forth the nature of the invention what is claimed herein is:

1. In a roller bearing, a roll formed of a spirally wound strand with integral collar thereon, the division between the strands extending through the said collar.

2. In a roller bearing, a roll formed of spiral coils with integral collar thereon, and the division between the coils extending through the said collar, and a washer applied to the body of the roll adjoining such collar to cover the division joint.

3. In a roller bearing, the combination, with a suitable casing, of spirally wound rolls fitted to such casing and having an integral collar thereon, and a hub having a seat fitted to the rolls and an annular shoulder adapted to engage the said collar.

4. In a roller bearing, the combination, with a suitable casing, of spirally wound rolls fitted to such casing and having an integral collar thereon, with washer fitted to the roll adjoining the collar, and a hub having a seat fitted to the rolls and an annular shoulder adapted to engage the said washer.

5. In a roller bearing, the combination, with a hub having opposed conical roll-seats with a groove at their junction forming shoulders at the bases of the seats, of spirally wound conical rolls having integral collars with beveled ends in contact in the said groove and the inner faces of the collars opposed to the said shoulders.

6. In a roller bearing, the combination, with a hub having opposed conical roll-seats with a groove at their junction forming shoulders at the bases of the seats, of spirally wound conical rolls having integral collars with beveled ends in contact in the said groove and the inner faces of the collars opposed to the said shoulders, and provided with washers to contact with the said shoulders.

In testimony whereof I have hereunto set my hand in the presence of two subscribing witnesses.

CHARLES S. LOCKWOOD.

Witnesses:
 ALFRED P. SLOAEEP,
 H. E. SAUL.